United States Patent Office 2,775,614
Patented Dec. 25, 1956

2,775,614
PRODUCTION OF ESTERS OF γ-CHLOROBUTYRIC ACID

Friedrich Hoelscher, Otterstadt, Germany, assignor to Badische Anilin- & Soda-Fabrik Aktiengesellschaft, Ludwigshafen (Rhine), Germany No Drawing. Application June 13, 1952,
Serial No. 293,452

Claims priority, application Germany July 13, 1951

3 Claims. (Cl. 260—487)

This invention relates to an improved process for the production of γ-chlorobutyric acid esters.

It is known that by the reaction of γ-butyrolactone with hydrogen chloride, mixtures of γ-chlorobutyric acid and varying amounts of an ester-like condensation product of γ-chlorobutyric acid with γ-hydroxybutyric acid of the formula

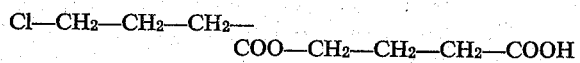
Cl—CH₂—CH₂—CH₂—
  COO—CH₂—CH₂—CH₂—COOH are obtained. If the reaction is carried out in the presence of alcohols or polyhydroxy compounds, there are obtained, besides the simple γ-chlorobutyric acid esters of these hydroxy compounds, also esters of the said condensation products.

I have now found that simple esters of γ-chlorobutyric acid are obtained in very good yields and while avoiding undesirable by-products by leading dry hydrogen chloride into a boiling mixture of about equivalent amounts of γ-butyrolactone and hydroxy or polyhydroxy compounds diluted with a diluent which forms azeotropically-boiling mixtures with water under such conditions that the water formed is continuously removed azeotropically.

Suitable diluents which form azeotropically-boiling mixtures with water are for example methylene chloride, ethylene chloride, benzene or toluene. After the water driven over azeotropically with the diluent has been separated, the diluent is preferably led back into the reaction vessel, thus working with a cycle of the diluent. As hydroxy compounds which can be reacted with γ-butyrolactone and hydrogen chloride in this way there may be mentioned for example hexanol, cyclohexanol, ethylhexanol, benzyl alcohol, hexanediol-(1.6), di- and triethylene glycol, hexanetriol-(1.2.4) pentaerythritol or glycerol.

The esters obtainable in the said manner are valuable intermediates; they are also suitable as softening agents for synthetic materials.

The following example will further illustrate this invention but the invention is not limited to this example. The parts are by weight.

Example

In a boiler provided with a stirrer and a reflux column a mixture of 344 parts of commercial γ-butyrolactone, 236 parts of hexanediol-(1.6) and 1500 parts of toluene is caused to boil in such manner that about 1200 to 1600 parts of toluene distill over per hour and flow back into the boiler by way of a water separator and a siphon. As soon as this toluene cycle has been initiated, a current of dry hydrogen chloride is led into the boiler. The water formed thus distils over azeotropically with the toluene and is continually removed in the separator before the toluene returns to the boiler. As soon as no more water passes over, the introduction of hydrogen chloride and the heating are interrupted. The contents of the boiler are washed with water several times to removed dissolved excess hydrogen chloride, decolourised with carbon, filtered and freed from toluene under reduced pressure. As a residue there remains 575 parts (88% of the theoretical yield) of a pale brownish oil having a chlorine content of 20.3% (the calculated chloride content for the bis-γ-chlorobutyric acid ester of hexanediol-(1.6) is 21.7%).

Polyvinyl chloride foils which have been softened with this oil exhibit an excellent resistance to cold. If, instead of hexanediol-(1.6), equivalent amounts of hexanol, cyclohexanol, ethylhexanol, benzyl alcohol, glycerol, pentaerythrol, hexanetriol, di- or triethyleneglycol are used, similar products are obtained.

What I claim is:

1. An improved process for the manufacture of esters of γ-chlorobutyric acid which comprises passing dry hydrogen chloride into a boiling mixture of about equivalent amounts of γ-butyrolactone and hydroxy compounds in the presence of a diluent which forms an azeotropic mixture with water whereby the water formed during the reaction is continuously removed azeotropically, said hydroxy compounds being selected from the group consisting of aliphatic, cycloaliphatic and araliphatic mono to tetrahydroxy compounds containing from 3 to 8 carbon atoms in the molecule and devoid of reactive groups other than said hydroxyl groups.

2. Process for the manufacture of hexanediol-1,6-bis-γ-chlorobutyrate which comprises passing dry hydrogen chloride into a boiling mixture of about equivalent amounts of γ-butyrolactone and hexanediol-1,6 in the presence of a diluent which forms an azeotropic mixture with water whereby the water formed during the reaction is continuously removed azeotropically.

3. A process for the manufacture of hexanediol-1,6-bis-γ-chlorobutyrate which comprises passing dry hydrogen chloride into a boiling mixture of about equivalent amounts of γ-butyrolactone and hexanediol-1,6 in the presence of toluene whereby the water formed during the reaction is continuously removed azeotropically.

References Cited in the file of this patent

UNITED STATES PATENTS 2,422,728    Gresham _____ June 24, 1947

OTHER REFERENCES

Noyes: J. Amer. Chem. Soc. 25, 1094 (1903).
Levene et al.: J. Biol. Chem. 78 (1928), p. 17.